A filter device includes a casing having an inlet for introducing fluid and an outlet for discharging fluid, and a filtering element disposed between the inlet and the outlet. The filtering element has an outer circumference face restricted from being deformed in a fluid flowing direction. The filtering element has an upstream end face on an upstream side in the fluid flowing direction, and a downstream end face on a downstream side in the fluid flowing direction. The filtering element is configured to be compressed toward the upstream end face by pressing the downstream end face.

17 Claims, 4 Drawing Sheets

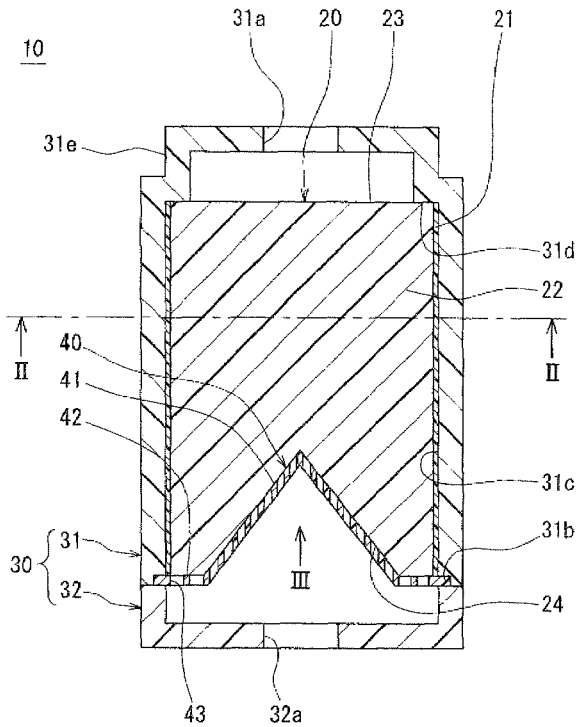

FILTER DEVICE AND METHOD OF PRODUCING THE SAME

CROSS REFERENCE TO RELATED APPLICATION

This application is based on Japanese Patent Application No. 2008-210113 filed on Aug. 18, 2008, the disclosure of which is incorporated herein by reference in its entirety.

BACKGROUND OF THE INVENTION

1. Field of the Invention

The present invention relates to a filter device, and a method of producing the filter device.

2. Description of Related Art

A conventional filter device includes filtering elements having different meshes, which are arranged in series in a fluid flowing direction. A coarse-mesh filtering element is arranged at an upstream side of the fluid flowing direction, and a fine-mesh filtering element is arranged at a downstream side of the fluid flowing direction. Large foreign objects are collected by the coarse-mesh filtering element, such that efficiency of collecting foreign objects is increased. Further, distribution of the collected foreign object in the filter device becomes proper. Therefore, pressure loss can be restricted from being increased, while the amount of the collected foreign object is increased.

JP-A-2003-214270 discloses a filter device having a single filtering element. A part of the filtering element is compressed so as to make the part to have fine mesh. That is, one kind of filtering element is used in the filter device, and a fine-mesh portion is formed in a part of the filtering element.

In this case, an upstream part of the filtering element in a fluid flowing direction is not compressed. A downstream part of the filtering element in the fluid flowing direction is compressed to a wall face of a casing accommodating the filtering element. Compression ratio is gradually increased toward a downstream end of the filtering element. Due to the compression, density of the filtering element becomes high, and mesh of the filtering element becomes fine. The density of the filtering element is gradually increased toward the downstream end of the filtering element. That is, the filtering element has a density gradient.

However, a cross-sectional area of the compressed portion of the filtering element is decreased. The cross-sectional area is an area of a cross-section perpendicular to the fluid flowing direction. The downstream end of the filtering element corresponding to a fluid outlet of the filter device has the maximum density and the minimum cross-sectional area. That is, a cross-sectional area of a fluid passage is decreased as the density is increased, in the filtering device having the density gradient.

When the cross-sectional area is decreased, filtering area for collecting foreign objects is decreased. When the amount of the collected foreign object is increased, pressure loss of the filtering element is increased, because the filtering element is clogged. Further, fluid pressure at an upstream side of the clogged part in the fluid flowing direction is increased, and a flowing speed of fluid is increased, when the cross-sectional area is decreased. Thus, a push-out phenomenon may be generated, in which foreign object collected in the clogged part flows out of the filtering element due to fluid force. That is, foreign objects may be discharged out of the filter device.

SUMMARY OF THE INVENTION

In view of the foregoing and other problems, it is a first object of the present invention to provide a filter device, and it is a second object of the present invention to provide a method of producing the filter device.

According to a first example of the present invention, a filter device includes a casing and a filtering element. The casing has an inlet for introducing fluid and an outlet for discharging fluid. The filtering element is disposed between the inlet and the outlet of the casing, and fluid passes through the inlet, the filtering element, and the outlet in this order. The filtering element has an outer circumference face extending in a fluid flowing direction, and at least a part of the outer circumference surface is restricted from being deformed in the fluid flowing direction. The filtering element has an upstream end face on an upstream side in the fluid flowing direction, and a downstream end face on a downstream side in the fluid flowing direction. The filtering element is configured to be compressed toward the upstream end face by pressing the downstream end face.

Accordingly, the filter device can properly collect foreign objects.

According to a second example of the present invention, a filter device includes a first casing, a second casing, a retainer, and a filtering element. The first casing has an inlet for introducing fluid. The second casing has an outlet for discharging fluid, and is connected to the first casing. The retainer is disposed between the first casing and the second casing, and has a protrusion shape protruding toward the first casing. The filtering element is disposed between the first casing and the retainer. The filtering element has an upstream end face at an upstream side in a fluid flowing direction, a downstream end face at a downstream side in the fluid flowing direction, and an outer circumference face extending in the fluid flowing direction. The upstream end face opposes to the inlet, and the downstream end face opposes to the outlet. The downstream end face has a recess shape corresponding to the protrusion shape of the retainer, so as to define a density gradient of the filtering element in the fluid flowing direction. The outer circumference face is restricted from being deformed, so as to have a fluid passage area approximately uniform between the upstream end face and the downstream end face.

Accordingly, the filter device can properly collect foreign objects.

According to a third example of the present invention, in a method of producing a filter device, a filtering element is arranged in a first casing having a fluid inlet, so as to restrict an outer circumference face of the filtering element from being deformed in a fluid flowing direction. The filtering element is compressed toward an upstream end face of the filtering element in the fluid flowing direction by pressing a downstream end face of the filtering element. A second casing having a fluid outlet is connected to the first casing.

Accordingly, the filter device able to properly collect foreign objects can be produced.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENT

First Embodiment

A fitter device is used as a fuel filter 10 for filtering fuel, for example. The fuel filter 10 is mounted in an automobile, and fuel passes through the fuel filter 10 before being supplied to an engine from a fuel tank.

Figure 1:
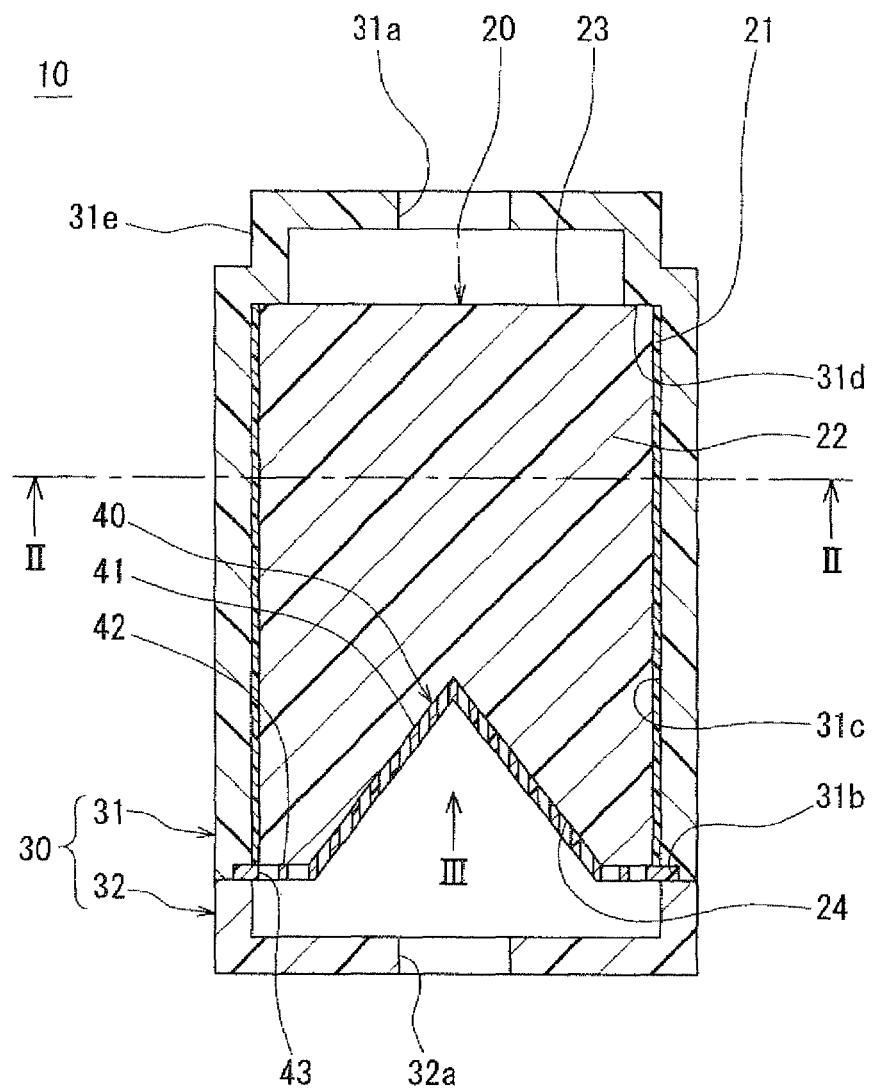
FIG. 1 is a cross-sectional view illustrating a fuel filter according to a first embodiment.

As shown in FIG. 1, the fuel filter 10 includes a casing 30, and a filtering element 20 disposed in the casing 30. The casing 30 has an inlet 31a for introducing fluid such as fuel, and an outlet 32a for discharging fluid, at predetermined positions.

The casing 30 is constructed with a first case 31 and a second case 32, each of which having a based approximately cylinder shape. The first case 31 is located at an upper side of FIG. 1, and the second case 32 is located at a lower side of FIG. 1. An open-end of the first case 31 and an open-end of the second case 32 are connected to each other. The first case 31 and the second case 32 are produced by molding resin materials, for example.

As shown in an upper side of FIG. 1, a base part of the first case 31 has the inlet 31a for introducing fuel into the casing 30. The first case 31 has a cylindrical inner space 31c, and the filtering element 20 is disposed in the space 31c. The first case 31 has an end portion 31e adjacent to the base part, and the end portion 31e has an inner diameter smaller than that of the space 31c. Thereby, a contact part 31d is defined between the space 31c and the end portion 31e, due to a difference of the diameters. The contact part 31d restricts the filtering element 20 from moving toward the inlet 31a.

A guide part 31b is defined at the open-end of the first case 31, as shown in FIG. 1. The guide part 31b has an inner dimension set to fit with an outer circumference face of a flange 43 of a retainer 40 to be described below. A depth dimension of the guide part 31b is set to be approximately equal to a thickness of the flange 43.

As shown in a lower side of FIG. 1, a base part of the second case 32 has the outlet 32a for discharging fuel from the casing 30. The fuel filter 10 is arranged in a fuel pipe (not shown) supplying fuel from a fuel tank (not shown) to an engine (not shown). When the inlet 31a is connected to an upstream side of the fuel pipe, and when the outlet 32a is connected to a downstream side of the fuel pipe, fuel flows into the fuel filter 10 through the inlet 31a, and is discharged out of the fuel filter 10 through the outlet 32a, after passing through the filtering element 20.

The filtering element 20 is made of a nonwoven cloth, and an outer circumference face of the filtering element 20 has a hardened part 21 shaped in a thin cylinder extending in a fuel flowing direction. The hardened part 21 is defined over entire length of the filtering element 20 in the fuel flowing direction, which corresponds to up-and-down direction of FIG. 1.

Figure 2:
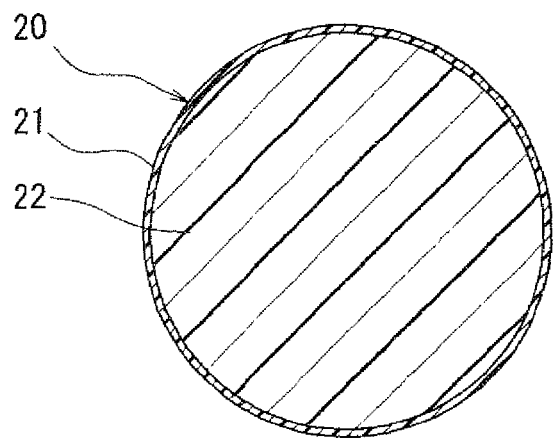
FIG. 2 is a cross-sectional view taken along line II-II of FIG. 1.

The hardened part 21 is produced by melting and hardening only a surface of the nonwoven cloth of the filtering element 20, by using a heating portion such as an ultrasonic welding device. As shown in FIG. 2, the hardened part 21 has an approximately cylinder shape, and is integrated with a non-hardened part 22 made of the nonwoven cloth located on an inner side of the hardened part 21. The filtering element 20 simply has an approximately cylindrical column shape. When the filtering element 20 is arranged in the space 31c of the first case 31, and when a retainer 40 to be described below is mounted on the filtering element 20, a downstream end face 24 of the filtering element 20 is pressed by the retainer 40. Thus, a part of the filtering element 20 is compressed and deformed so as to have approximately the same shape as the retainer 40, as shown in FIG. 1.

A material of the filtering element 20 is not limited to the nonwoven cloth. Alternatively, the filtering element 20 may be made of a porous member made of urethane resin having a foam-continuation structure, for example. Alternatively, the filtering element 20 may be made of assembly of fiber such as resin, inorganic material, metal, or natural fabric, for example. The filtering element 20 is chemically stable against fuel to be filtered.

The retainer 40 corresponds to a compressing portion. The retainer 40 is produced by molding a resin material, or press-working a metal plate, for example. The retainer 40 has a conical surface 41 in addition to the flange 42. The conical surface 41 contacts the downstream end face 24 of the filtering element 20, when the retainer 40 is mounted in the fuel filter 10. The conical surface 41 has a curved shape protruding toward an upstream end face 23 of the filtering element 20. The flange 42 extends outward from a base edge of the conical surface 41.

Figure 3:
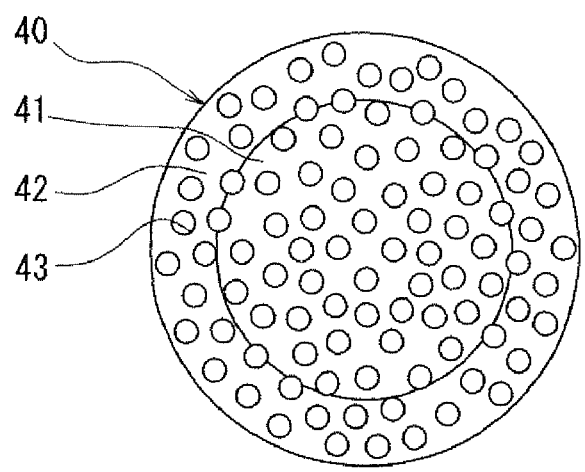
FIG. 3 is a bottom view illustrating a filtering element of the fuel filter in an arrow direction III of FIG. 1.

As shown in FIG. 1, through holes 43 are defined in the conical surface 41 and the flange 42. Fuel passing through the filtering element 20 is flowing out of the filtering element 20 through the through holes 43. As shown in FIG. 3, a large number of the through holes 43 are defined over all area of the conical surface 41 and the flange 42, such that fuel flow is not restricted by the through holes 43.

A method of producing the fuel filter 10 will be described.

The hardened part 21 is formed on an outer circumference face of the filtering element 20 extending in the fuel flowing direction. The filtering element 20 having the hardened part 21 is arranged in the space 31c of the first case 31. The upstream end face 23 of the filtering element 20 is made contact with the contact part 31d of the first case 31.

The retainer 40 is arranged in the first case 31. A cone point of the conical surface 41 of the retainer 40 is made contact with the downstream end face 24 of the filtering element 20. The retainer 40 is pressed into the filtering element 20 toward the upstream end face 23, and the flange 42 of the retainer 40 is fitted to the guide part 31b of the first case 31.

The second case 32 is fixed to the first case 31, by using an ultrasonic welding device, for example.

A density distribution of the filtering element 20 arranged in the fuel filter 10 will be described. Because resin fibers are uniformly mixed and bound in the nonwoven cloth of the filtering element 20, the filtering element 20 has elasticity and flexibility. When an outside force is not applied to the filtering element 20, an interval between fibers inside of the filtering element 20 is uniform. That is, when the filtering element 20 is in an unrestrained state, a dimension of a clearance between fibers is approximately the same. Further, a density of the filtering element 20 is constant. That is, a ratio of a fiber volume to a unit volume of the filtering element 20 is constant. In contrast, when the filtering element 20 is arranged in the fuel filter 10, the downstream end face 24 of the filtering element 20 is pressed by the retainer 40.

When an outside force is applied to the filtering element 20, the filtering element 20 is elastically deformed, such that the volume of the filtering element 20 is decreased. Thereby, the density of the filtering element 20 is increased. Here, if the filtering element 20 does not have the hardened part 21, a volume decreasing ratio is uniform over the whole filtering element 20. Similarly, a density increasing ratio is uniform over the whole filtering element 20, if the filtering element 20 does not have the hardened part 21.

In contrast, when the filtering element 20 has the hardened part 21, the deformation of the filtering element 20 in a direction of the applied force is restricted by the hardened part 21. The direction of the applied force corresponds to the fuel flowing direction, and a direction connecting the upstream end face 23 and the downstream end face 24.

Therefore, the amount of the deformation becomes the largest in a part of the filtering element 20 receiving the force. That is, the amount of the deformation becomes the largest in an adjacency of the downstream end face 24, to which the retainer 40 is pressed. The amount of the deformation is reduced, as leaving from the downstream end face 24. The density of the filtering element 20 becomes the highest in the adjacency of the downstream end face 24, and is reduced as leaving from the downstream end face 24. In an adjacency of the upstream end face 23, which is the farthest position from the downstream end face 24, the density is approximately equal to a density of the filtering element 20 in an unrestrained state.

Figure 4:
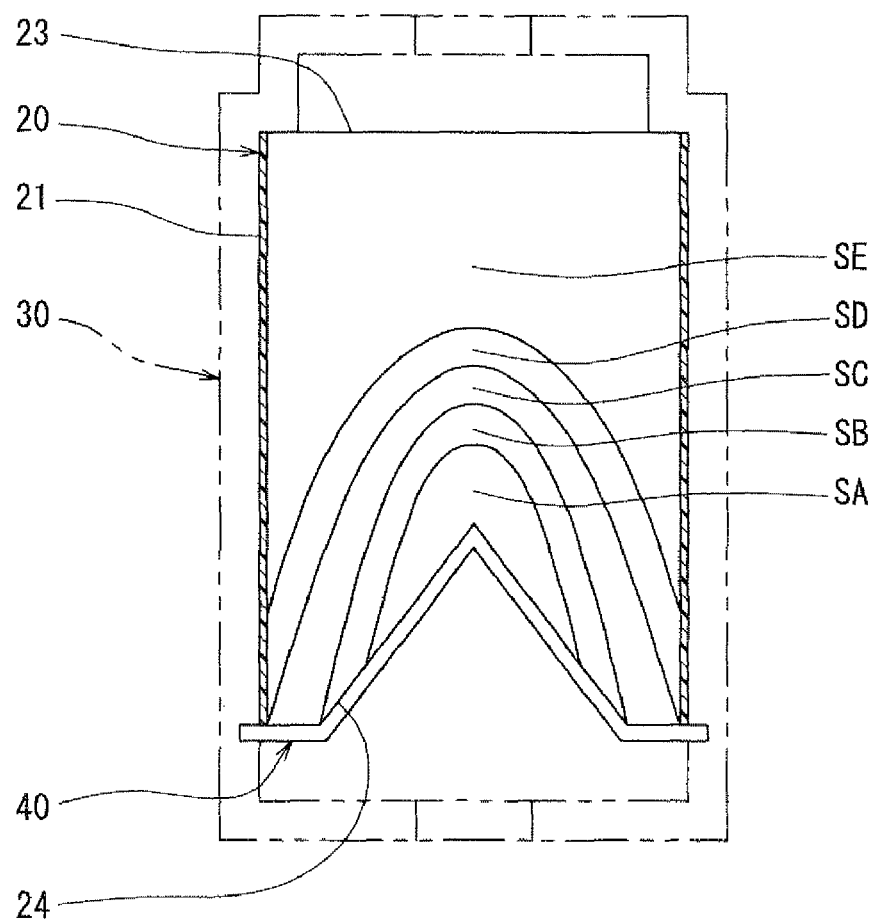
FIG. 4 is a schematic view illustrating a density distribution of the filtering element.

According to the first embodiment, the density of the filtering element 20 of the fuel filter 10 is not uniform. The density of the filtering element 20 is gradually increased from the upstream end face 23 toward the downstream end face 24. Thus, density gradient can be formed in the filtering element 20, and an example of the density gradient is shown in FIG. 4. The density of the filtering element 20 becomes the highest in a section SA. Densities of a section SB, a section SC, and a section SD are gradually decreased in this order. A density of a section SE is approximately equal to a density of the filtering element 20 in an unrestrained state.

That is, the density of the filtering element 20 becomes higher in an area closer to the downstream end face 24, and the density of the filtering element 20 becomes higher with distance from the outer circumference face. That is, the density gradient is less in adjacency of the outer circumference face and the upstream end face 23.

Because the retainer 40 having a convex shape presses the downstream end face 24 of the filtering element 20, a cross-sectional area approximately perpendicular to the fuel flowing direction is decreased around the flange 42 of the retainer 40. However, as shown in FIG. 4, a cross-sectional area corresponding to the convex shape of the retainer 40 is approximately constant in the density gradient.

In a comparison filter device, density gradient is formed by compressing a filtering element in a direction perpendicular to a fluid flowing direction. In this case, fluid passage area becomes the smallest at a high-density part having a high-compression ratio. Here, the fluid passage area corresponds to a cross-sectional area of the filtering element of the comparison filter device.

In contrast, according to the first embodiment, the retainer 40 compresses the filtering element 20 in an axis direction of the space 31c of the casing 30. That is, density gradient is formed by compressing the filtering element 20 in the fuel flowing direction. Therefore, the cross-sectional area of the filtering element 20 is constant from an inlet face of the filtering element 20 to an outlet face of the filtering element 20. That is, the fuel passage area is constant over the filtering element 20.

According to the first embodiment, an outer circumference face of the filtering element 20 has the hardened part 21, which restricts the deformation of the outer circumference face of the filtering element 20 in the fuel flowing direction.

Further, the filtering element 20 is compressed from the downstream end face 24 toward the upstream end face 23 by the retainer 40.

Thereby, the density gradient can be formed in the filtering element 20 without reducing the fuel passage area. That is, the density gradient can be formed in the filtering element 20 without reducing the fuel passage area of the filtering element 20. An upstream side of the filtering element 20 having low-density collects large foreign objects, and a downstream side of the filtering element 20 having high-density collects small foreign objects. Thus, distribution of the collected foreign objects can be proper in the filtering element 20. Pressure loss can be maintained at the minimum level, while the amount of the collected foreign objects is increased. Collection efficiency can be maintained at the maximum level, while the amount of the collected foreign objects is increased.

Accordingly, push-out phenomena can be restricted from being generated in the fuel filter 10, because the density gradient can be formed in the filtering element 20 without reducing the fluid passage area in the high-density part of the filtering element 20.

According to the first embodiment, the retainer 40 compresses the filtering element 20 by using the conical surface 41, which protrude toward the upstream end face 23 of the filtering element 20. Thereby, only by changing a shape of the retainer 40, a different density gradient can be easily formed in a filtering element of a fuel filter, without changing the filtering element 20 and the casing 30.

Second Embodiment

Figure 5:
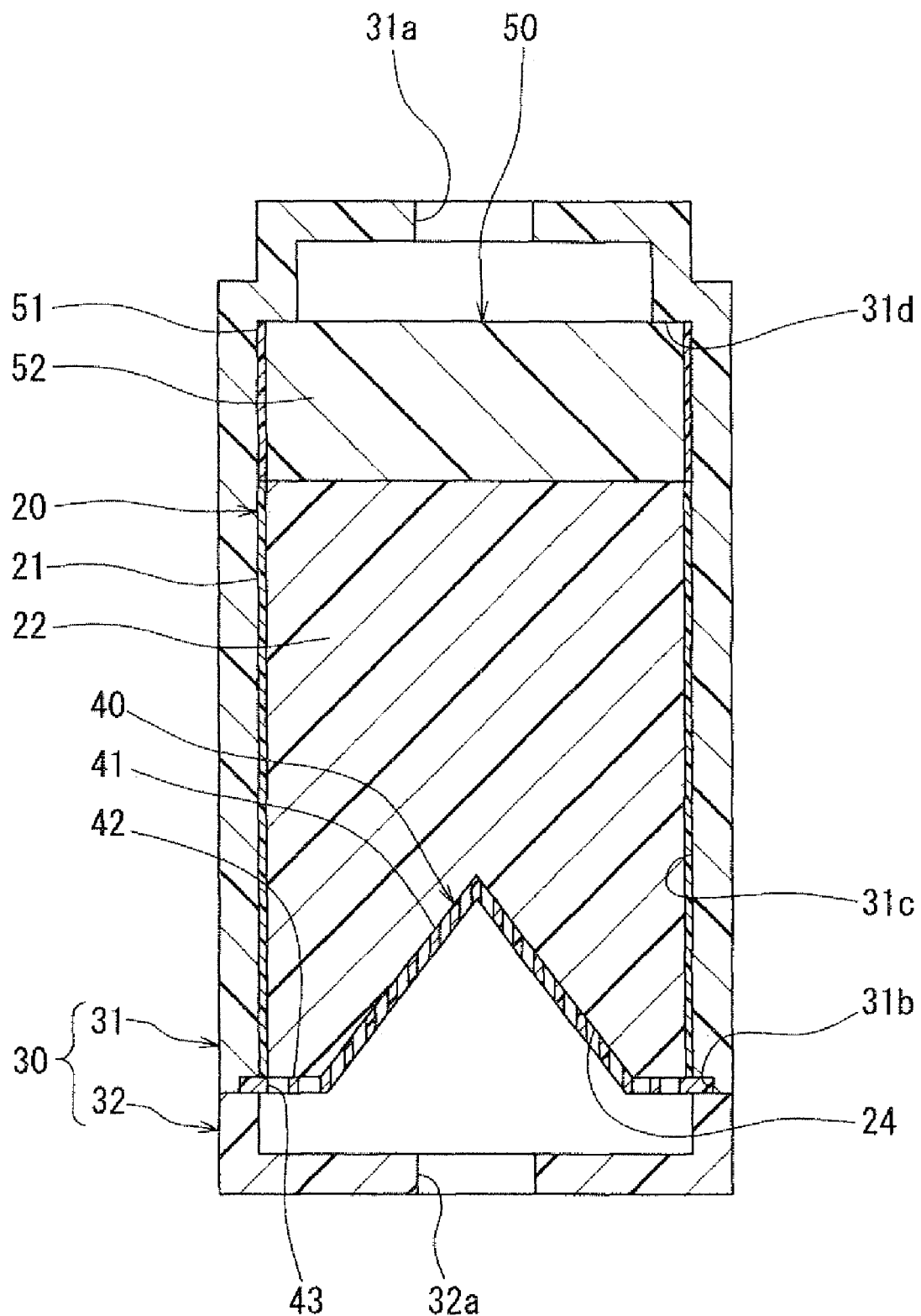
FIG. 5 is a cross-sectional view illustrating a fuel filter according to a second embodiment.

As shown in FIG. 5, a fuel filter 10 of a second embodiment has an auxiliary filtering element 50 at an upstream side of a filtering element 20 in a fuel flowing direction. The auxiliary filtering element 50 is stacked on the filtering element 20.

The auxiliary filtering element 50 is made of nonwoven cloth, and a mesh of the auxiliary filtering element 50 is set to be coarser than an original mesh of the filtering element 20. That is, a density of the auxiliary filtering element 50 is set to be lower than an original density of the filtering element 20.

An outer circumference face of the auxiliary filtering element 50 has a hardened part 51, similarly to the filtering element 20. Thereby, when a retainer 40 compresses the filtering element 20 in a process of assembling the fuel filter 10, the compressing force is transmitted from the hardened part 21 of the filtering element 20 to the hardened part 51 of the auxiliary filtering element 50. That is, the compressing force is not transmitted to a non-hardened part 52 of the auxiliary filtering element 50. Therefore, the density of the auxiliary filtering element 50 is not changed.

According to the second embodiment, due to the auxiliary filtering element 50, a density gradient range of the fuel filter 10 can be enlarged to a low-density side. Therefore, if sizes of foreign objects are distributed in a wide range, that is, if fuel having larger foreign objects is filtered by the fuel filter 10 efficiency of collecting foreign objects can be improved. Further, pressure loss can be maintained at the minimum level, while the amount of the collected foreign objects is increased.

Figure 6:
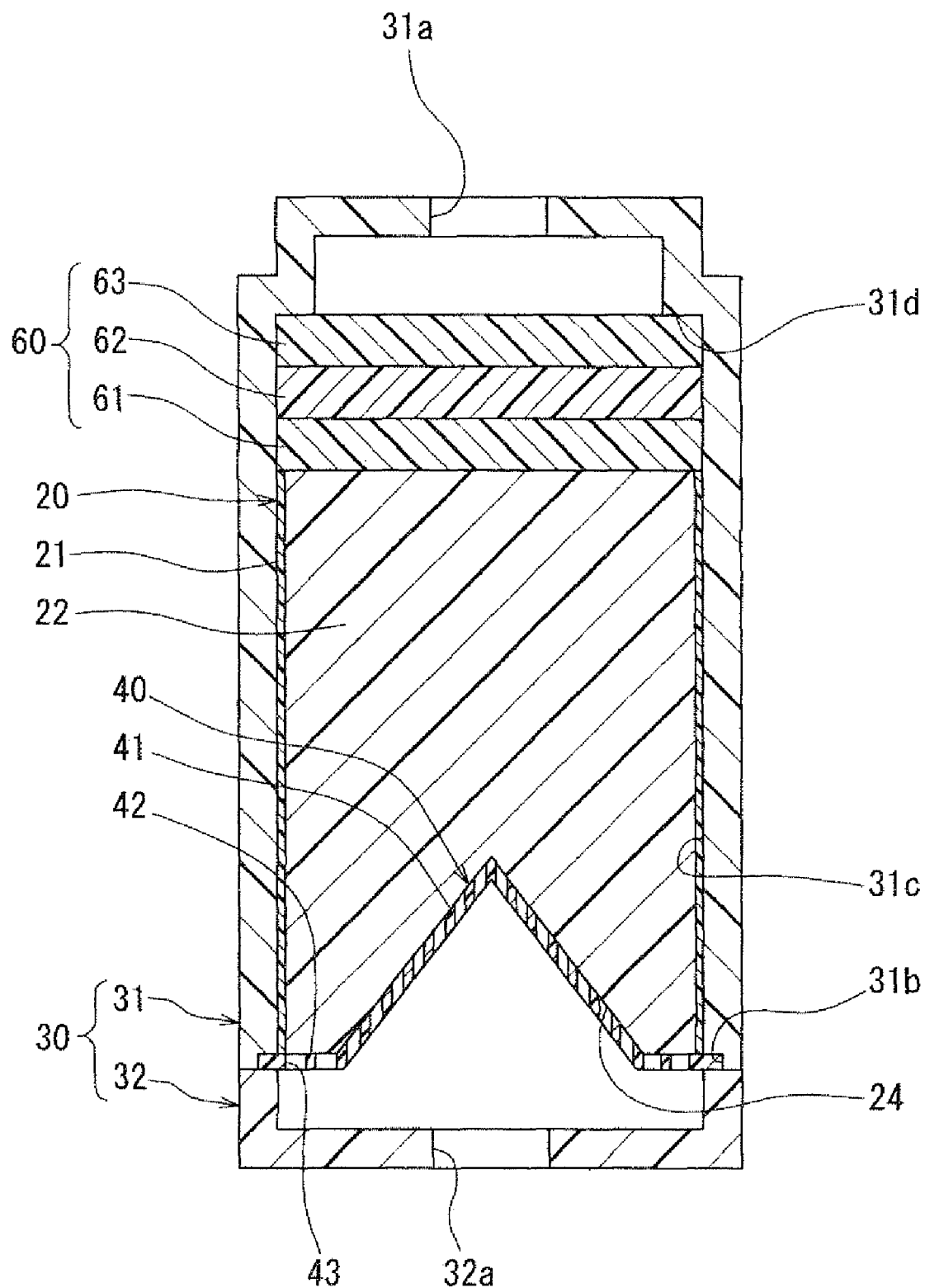
FIG. 6 is a cross-sectional view illustrating a modified fuel filter according to a second embodiment.

As shown in FIG. 6, three filter layers 61, 62, 63 are layered in an auxiliary filtering element 60, and the auxiliary filtering element 60 may be arranged on the filtering element 20 in the fuel flowing direction. In this case, densities of the filtering element 20 and the filter layers 61, 62, 63 are made to become lower from a downstream side to an upstream side in the fuel flowing direction. For example, meshes of the fuel filter 20, the filter layer 61, the filter layer 62, and the filter layer 63 are made coarser in this order. In this case, due to the auxiliary filtering element 60, a density gradient range of the fuel filter 10 can be enlarged to a low-density side.

The auxiliary filtering element 50, 60 may be made of a porous member made of urethane resin having a foam-continuation structure, for example. Alternatively, the filtering element 50, 60 may be made of assembly of fiber such as resin, inorganic material, metal, or natural fabric, for example.

The retainer 40 of the fuel filter 10 is not limited to have the conical surface 41 having the conical shape. The retainer 40 has a pressing part protruding toward the upstream end face 23 of the filtering element 20, and a shape of the pressing part may be different from the conical shape. For example, the shape of the pressing part may be spherical, or the retainer 40 may have two protruding parts.

The cylindrical hardened part 21, 51 is formed by melting and hardening the outer circumference face of the filtering element 20, 50 by using a heating device. Due to the hardened part 21, 51, the filtering element 20, 50 is restricted from being deformed in the fuel flowing direction, when the filtering element 20, 50 is compressed. Alternatively, the deformation of the filtering element 20, 50 in the fuel flowing direction may be restricted in other way other than the hardened part 21, 51. For example, the outer circumference face of the filtering element 20, 50 may be fixed to an inner wall of the space 31c by bonding or welding, without providing the hardened part 21, 51. Alternatively, a thin cylindrical sleeve made of resin or metal may be fitted and fixed to the outer circumference face of the filtering element 20, 50.

The fuel filter 10 is used to filter fuel, as the filter device. However, fluid to be filtered is not limited to fuel. For example, drinking water, industrial water, edible beverage, or chemical solution may be filtered as fluid, or gas may be filtered, by using the filter device.

Such changes and modifications are to be understood as being within the scope of the present invention as defined by the appended claims.

What is claimed is:

1. A filter device comprising:
   a casing having an inlet for introducing fluid and an outlet for discharging fluid;
   a filtering element disposed between the inlet and the outlet of the casing, wherein fluid passes through the inlet, the filtering element, and the outlet in this order; and
   a compressing portion compressingly contacting the filtering element, wherein
   the filtering element has an outer circumference face extending in a fluid flowing direction,
   the outer circumference face of the filtering element has a hardened part produced by hardening only a surface of the filtering element and being integrated with a non-hardened part of the filtering element disposed on an inner side of the hardened part,
   the filtering element has an upstream end face on an upstream end in the fluid flowing direction, and a downstream end face on a downstream end in the fluid flowing direction,
   the compressing portion has a curved contact surface protruding toward the upstream end face,
   the filtering element is compressed in the fluid flowing direction by the compressing portion compressingly contacting the downstream end face, and
   the hardened part of the outer circumference face of the filtering element maintains an outer peripheral dimension of the filtering element approximately uniform between the upstream end face and the downstream end face when the compressing portion compressingly contacts the downstream end face to compress the filtering element in the fluid flowing direction.

2. The filter device according to claim 1, further comprising:
   an auxiliary filtering element stacked on an upstream side of the filtering element in the fluid flowing direction, wherein the auxiliary filtering element has a mesh coarser than a mesh of the filtering element.

3. The filter device according to claim 2, wherein
   the auxiliary filtering element has a plurality of filter layers layered in the fluid flowing direction.

4. The filter device according to claim 3, wherein
   the filter layer of the auxiliary filtering element adjacent to the filtering element has the finest mesh among the plurality of filter layers, and
   the plurality of filter layers have meshes set to gradually become coarser toward the upstream side in the fluid flowing direction.

5. The filter device according to claim 3, wherein
   the filtering element, the auxiliary filtering element, and the filter layers are made of nonwoven cloth, fiber assembly, or resin having a foam-continuation structure.

6. The filter device according to claim 1, wherein
   the hardened part is produced by melting and hardening only an outer circumferential surface of the filtering element.

7. The filter device according to claim 6, wherein
   the outer circumferential surface is melted and hardened using an ultrasonic welding device to produce the hardened part.

8. The filter device according to claim 1, wherein the hardened part is shaped as a thin cylinder extending along an entire length of the filtering element in the fuel flowing direction.

9. A filter device comprising:
   a first casing having an inlet for introducing fluid;
   a second casing having an outlet for discharging fluid, the second casing being connected to the first casing;
   a retainer disposed between the first casing and the second casing, the retainer having a protrusion shape protruding toward the first casing; and
   a filtering element disposed between the first casing and the retainer, wherein
   the filtering element has
      an upstream end face at an upstream end in a fluid flowing direction, the upstream end face opposing to the inlet,
      a downstream end face at a downstream end in the fluid flowing direction, the downstream end face opposing to the outlet, and
      an outer circumference face extending in the fluid flowing direction, the outer circumference face of the filtering element having a hardened part produced by hardening only a surface of the filtering element and being integrated with a non-hardened part of the filtering element disposed on an inner side of the hardened part,
   the hardened part of the outer circumference face being restricted from being deformed, so as to maintain a fluid passage area approximately uniform between the upstream end face and the downstream end face, and
   the retainer compresses the filtering element by pressingly contacting the downstream end face of the filtering element, whereby the downstream end face of the filtering element is deformed to a recess shape corresponding to the protrusion shape of the retainer, so as to define a density gradient in the filtering element in the fluid flowing direction.

10. The filtering device according to claim 1, wherein the filtering element is compressed in an axial direction by the compressing portion.

11. The filtering device according to claim 1, wherein the compressing portion compresses the filtering element and maintains the filtering element in a compressed state.

12. The filtering device according to claim 9, wherein the retainer has a curved contact surface protruding toward the upstream end face.

13. The filtering device according to claim 9, wherein the density gradient is formed in an axial direction.

14. The filtering device according to claim 9, wherein the retainer compresses the filtering element and maintains the filtering element in a compressed state.

15. The filter device according to claim 9, wherein the hardened part is produced by melting and hardening only an outer circumferential surface of the filtering element.

16. The filter device according to claim 15, wherein the outer circumferential surface is melted and hardened using an ultrasonic welding device to produce the hardened part.

17. The filter device according to claim 9, wherein the hardened part is shaped as a thin cylinder extending along an entire length of the filtering element in the fuel flowing direction.

* * * * *